Sept. 15, 1936. J. J. SEITZ ET AL 2,054,449
DOOR DOVETAIL
Filed July 12, 1935
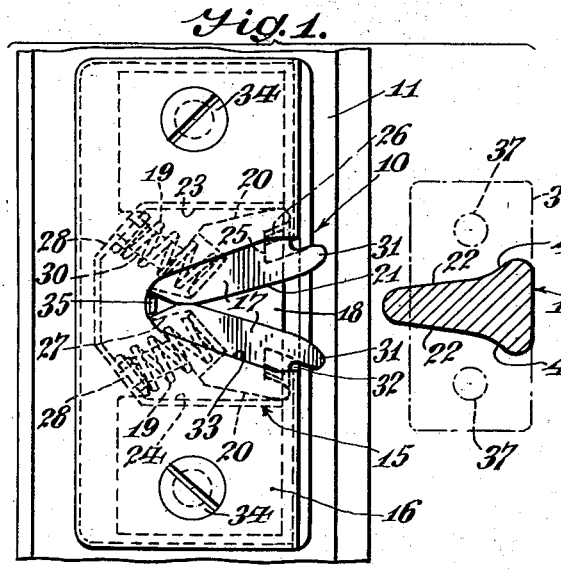
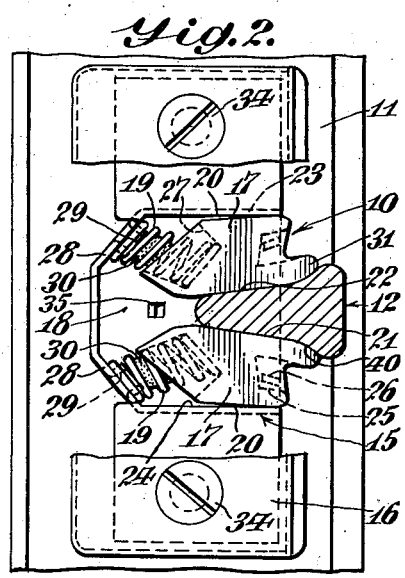
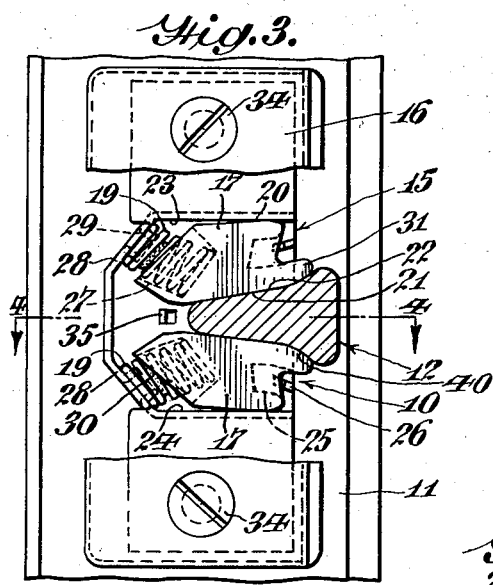
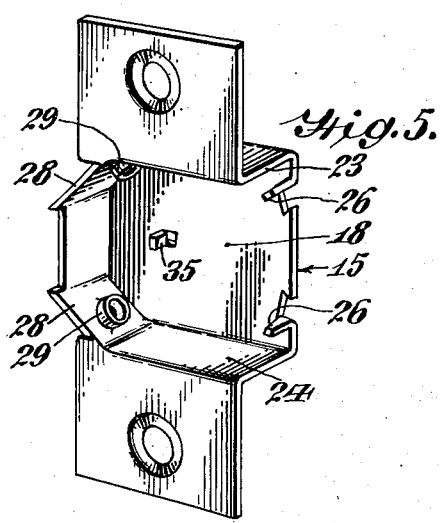
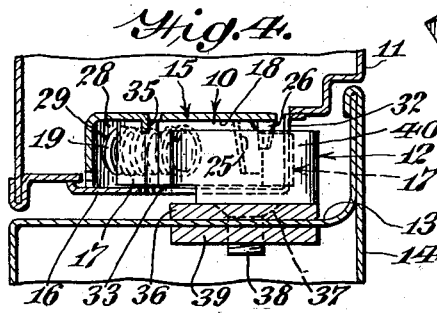
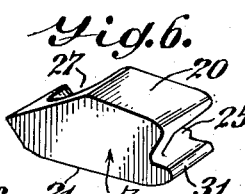
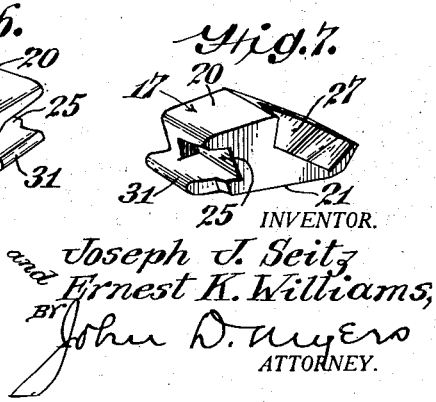
INVENTOR.
Joseph J. Seitz
and Ernest K. Williams,
BY
ATTORNEY.

Patented Sept. 15, 1936

2,054,449

UNITED STATES PATENT OFFICE 2,054,449

DOOR DOVETAIL

Joseph J. Seitz and Ernest K. Williams, Philadelphia, Pa., assignors to Mitchell Specialty Company, a corporation of Pennsylvania Application July 12, 1935, Serial No. 31,021

8 Claims. (Cl. 16—85)

This invention relates to door dovetails and involves various improvements in the structure of such devices whereby, when an automobile or other type of door is moved into closed position, a wedge or spreader member carried by the free vertical edge of the door is brought into engagement with a pair of movable bearing blocks mounted on the door frame and so constructed that the inner ends of the blocks may be spread apart to a limited extent to permit the wedge member to be received therebetween and to be rigidly supported against vertical movement, whereupon the bearing blocks may be moved inwardly in the direction of movement of the wedge member as the door is moved into completely closed position.

One of the objects of the invention is the provision of improved means for rigidly supporting a door against vertical movement when in its fully closed position. This object is accomplished by the provision of opposed bearing blocks mounted upon the door frame and movable with respect to each other and with respect to the wedge member carried by the edge of the door, portions of the bearing blocks being movable away from each other to permit the entrance of the wedge member therebetween, and the blocks being rigidly supported against all vertical movement when the door is in its completely closed position.

A further object of the invention is the provision of improved means for rigidly supporting the door against vertical movement when in its fully closed position, and at the same time permitting the bearing blocks, forming a part of said means, to have a limited movement in a horizontal direction during the final closing movement of the door. This object is accomplished by so constructing the bearing blocks, the housing within which the blocks are mounted, and the wedge member, that portions of the bearing blocks are moved away from each other as the wedge member moves into position between the bearing blocks, and by rigidly supporting the bearing blocks for sliding movement in the direction of movement of the wedge member as the door moves into its fully closed position.

Another object of the invention is the provision of an improved dovetail structure having a pair of opposed bearing blocks, the outer ends of which are rigidly supported at all times against movement away from each other, and the inner ends of which are supported for limited movement away from each other in order to provide for the proper make-up of the dovetail as the door moves into closed position. This object is accomplished by rigidly supporting the outer ends of the bearing blocks for rocking movement to a limited extent as the wedge member moves into make-up position between the blocks, and by so constructing and arranging the blocks with respect to the supports therefor that the blocks may have a limited movement in the direction of movement of the wedge member as the door moves into open and closed positions.

It is also an object of the invention to provide a dovetail structure in which ordinary wear of the wedge member and the bearing blocks is automatically taken care of without any adjustment of parts or replacement thereof. This object is accomplished by a construction and arrangement of the bearing blocks such that the angle between the opposed faces of the blocks when the wedge member is out of position therebetween is greater than the angle between the opposite faces of the wedge member; by providing a limited movement of the inner ends of the bearing blocks away from each other; by rigidly supporting the bearing blocks against movement away from each other when the wedge member is in position therebetween; and by utilizing resilient means for urging the inner ends of the bearing blocks toward each other and for urging the blocks in the direction of movement of the wedge member as the door is moved from its fully closed position.

A still further object of the invention is the provision of an improved dovetail structure wherein a single pair of coiled springs is utilized for urging the inner ends of the bearing blocks toward each other to clamp the wedge member between the blocks, and for urging the blocks toward one limit of their movement in the direction of movement of the wedge member.

Other objects and advantages of the improved structure will be apparent from the following description, taken with the accompanying drawing wherein:

Fig. 1 is a side elevational view of the receiving member, with the wedge member out of engagement therewith and shown in section;

Fig. 2 is a side elevational view of the receiving member, with parts broken away, and with the wedge member shown in section and in make-up position with respect to the bearing blocks of the receiving member;

Fig. 3 is a view similar to Fig. 2, but showing the bearing blocks and wedge member in the position which they occupy when the door is completely closed;

Fig. 4 is a transverse sectional view taken on the line 4—4 of Fig. 3;

Fig. 5 is a perspective view of the housing of the receiving member, without the cover plate; and Figs. 6 and 7 are perspective views of one of the bearing blocks in different positions.

As disclosed herein the receiving member 10 of the improved dovetail structure is mounted upon the door frame 11 of an automobile body of pressed metal construction, and the wedge member 12 is secured to the free vertical edge 13 of the door 14 in such a position as to cooperate with the receiving member 10 when the door 14 is moved into closed position. As is well understood in the art, however, the relative location of these parts may be reversed, that is, the receiving member 10 may be carried by the edge of the door, and the wedge member 12 may be mounted on the door frame.

The receiving member 10 comprises a housing made up of a recess member 15 and a cover plate 16, a pair of opposed bearing blocks 17 mounted in the recess 18 of the recess member, and a pair of coiled springs 19 or other suitable resilient means interposed between the bearing blocks 17 and the walls of the recess 18 for urging the inner ends of the blocks 17 toward each other and for urging the blocks toward the front of the recess.

The two bearing blocks 17 are similarly formed of rigid material, are somewhat irregular in shape, and are provided with opposite, substantially parallel surfaces 20 and 21. The inner surface 21 of each block is designed to cooperate with the adjacent surface 22 of the wedge member 12, and the outer surfaces 20 of the blocks are designed to cooperate with rigid supports 23 and 24, formed by the upper and lower walls of the recess 18.

As shown in Figs. 1 and 2 of the drawing, the outer end of each block 17 is notched as indicated at 25 to receive a lug 26 punched inwardly from the wall of the recess 18 for the purpose of maintaining the outer ends of the blocks spaced from each other when the wedge member 12 is out of position between the blocks. The inner ends of the blocks are so constructed and arranged within the housing that they contact with each other, as shown in Fig. 1, when the door is in its open position, and the inner ends have limited movement away from each other when the wedge member 12 is moved into the make-up position during the closing movement of the door as shown in Fig. 2.

The coiled spring 19 arranged between the inner end of each block 17 and the wall of the housing has its outer end preferably seated in a recsss 27 in the block and its inner end supported upon a wall portion 28 inclined with respect to the upper and lower walls 23 and 24 and having an inwardly punched retainer 29 for engagement within the end of the spring 19 to hold it in position. A piece of felt 30 having a suitable lubricant incorporated therein may be encased within each of the coiled springs 19 if desired.

The front or outer edge of the recess 18 is preferably open as shown in Fig. 5, and the bearing blocks 17 are retained therein against the action of the coiled springs 19 by means of the inwardly pressed lugs 26 heretofore described. The outer end of each bearing block is preferably provided with a projecting portion 31 which extends outwardly through an opening 32 in the front edge of the cover plate 16 to guide the wedge member 12 into position. The front opening 32 is continuous with a V-shaped opening 33 in the face of the cover plate for the reception of the wedge member 12.

The receiving member 10 is secured in position on the door frame by means of screws 34 passing through alined openings 16 in the cover plate 16, the recess member 15 and the door frame 11. It will be understood, however, that these parts may be welded or otherwise secured to the door frame 11, as it is not essential that they be removable inasmuch as the structure herein shown is of a type which may be serviced through the front opening 32 of the housing. In case it is desired to replace one of the bearing blocks 17 or one of the coiled springs 19, these parts may be readily removed from the recess 18 by forcing one of the blocks inwardly against its spring 19, whereupon the notch 25 may be disengaged from the lug 26 to permit the removal of the block and spring through the front opening 32. In order to retain the remaining block 17 in position in the recess 18, a lug 35 is punched inwardly from the recess wall in a position to be engaged by the inner end of each block. Likewise the blocks 17 and springs 19 may be inserted in the recess 28 through the front opening 32 without removing the cover plate 16.

As disclosed herein, the wedge member 12 is of solid construction and is formed on a base plate 36 provided with suitable openings 37 for receiving screws 38 to secure the same to the metal edge of the door 14. These screws extend through openings in the edge of the door and are threaded for cooperation with threaded openings in a retainer plate 39 on the inside of the edge of the door as shown in Fig. 4.

The wedge member 12 is so constructed that it does not taper uniformly from one end to the other. It is preferably provided with curved shoulders 40 near its larger end for abutment against corresponding curved surfaces on the projecting outer ends 31 of the blocks 17. With such a structure the wedge member operates to force the blocks 17 inwardly within the recess, after the make-up of the dovetail members, without jamming the blocks 17 against the supporting walls 23 and 24.

With the dovetail structure disclosed herein it will be apparent that the door is rigidly supported against all vertical movement when it is in completely closed position, notwithstanding the fact that the bearing blocks are supported for rocking movement about their outer ends and for bodily sliding movement in the direction of movement of the wedge member as the door moves to and from closed position.

The structure of the device wherein the bearing blocks are movable independently of each other provides a dovetail which will take care of the usual inaccuracies of manufacture and assembly and any sagging of the door after continued use. In case the wedge member is mounted on the door in such a position as to be slightly out of alinement with the receiving member, the wedge will first come into contact with one of the bearing blocks during the closing movement of the door and this block may rock independently of the other and permit the wedge member to be brought into alinement with the blocks and into the proper make-up position. While the outer ends of bearing blocks 17 are in contact with walls 23 and 24 at all times, it is perferable that wedge member 12, bearing blocks 17 and recess 18 be so proportioned that the inner ends of surfaces 20 are slightly spaced from walls 23 and 24 when the parts are in the normal make-up position as shown in Figs. 2 and 3 of the drawing.

The structure and arrangement of the receiving member and the wedge member are such as to produce a satisfactory dovetail of the "push-back" type in that, notwithstanding the fact that the blocks are rigidly supported against vertical movement, both the wedge member and the blocks, when made up, may move together horizontally without jamming during the final closing and the initial opening movements of the door. Such a structure obviates, to a great extent, any adjustment of the parts in a horizontal direction.

While specific forms and arrangements of the various parts of the improved structure have been disclosed, it is to be understood that the disclosure is illustrative only and that changes in form and arrangement of the elements may be made without departing from the invention, the scope of which is to be determined by the appended claims.

What we desire to claim as our invention is:

1. A door dovetail member comprising a housing having substantially parallel upper and lower walls and an opening in the front edge thereof to receive a wedge member, a pair of rigid blocks mounted for sliding movement on said walls when the wedge member is in position therebetween and having the outer ends supported for rocking movement on said walls and the inner ends in contact with each other when the wedge member is out of position between said blocks, and resilient means urging said blocks toward the front edge of said housing and the inner ends thereof toward each other.

2. A door dovetail member comprising a housing having substantially parallel upper and lower walls and an opening in the front edge thereof to receive a wedge member, a pair of rigid blocks mounted for movement to and fro in said housing and having opposing faces conforming to the faces of the wedge member when in position therebetween, means for supporting the outer ends of said blocks for rocking movement on said walls and spaced from each other and the inner ends of said blocks spaced from said walls to permit separation of the inner ends when the wedge member moves into position between the blocks, and resilient means urging said blocks toward the front edge of said housing and the inner ends thereof toward each other.

3. A door dovetail member comprising a housing having rigid upper and lower walls and an opening in the front edge thereof to receive a tapered wedge member, a pair of rigid blocks mounted in said housing for sliding movement on said walls with the inner ends thereof spaced from said walls when the wedge member is out of position between said blocks, means for supporting the outer ends of said blocks spaced from each other to receive the wedge member, and coiled springs angularly arranged with respect to said blocks and urging said blocks toward the front of said housing and the inner ends of said blocks away from said walls.

4. A door dovetail member comprising a substantially rectangular housing having rigid upper and lower walls and an opening in the front edge thereof to receive a wedge member, a pair of rigid blocks movably mounted in said housing, the outer ends of said blocks being spaced from each other and supported for rocking and sliding movement on said walls and the inner ends of said blocks being spaced from said walls and in contact with each other when the wedge member is out of position between said blocks, and coiled springs interposed between the inner ends of said blocks and the inner corners of said housing for urging said blocks toward the front of said housing and the inner ends of said blocks away from said walls.

5. In a door dovetail device, the combination of a pair of opposed rigid blocks having the outer ends thereof spaced from each other to receive a wedge member therebetween, the outer ends of said blocks being rigidly supported for rocking movement and the inner ends of said blocks having limited movement toward and away from each other, a wedge member movable into and out of position between said blocks, means for supporting said blocks for limited sliding movement in the direction of movement of said wedge member, and resilient means urging said blocks toward the limit of their sliding movement in one direction and urging the inner ends of said blocks toward each other.

6. In a door dovetail device, the combination of a pair of rigid blocks having the outer ends thereof spaced from each other to receive a tapered wedge member and having the opposed faces thereof converging from their outer ends toward their inner ends, the outer ends of said blocks being rigidly supported for rocking movement and the inner ends of said blocks having limited movement toward and away from each other, a wedge member movable into and out of position between said blocks and having the opposed faces thereof converging at an angle less than the angle between the opposed faces of said blocks when the inner ends of said blocks are at the limit of their movement toward each other, means for supporting said blocks for limited sliding movement in the direction of movement of said wedge member, and resilient means urging said blocks toward the limit of their sliding movement in one direction and urging the inner ends of said blocks toward each other.

7. A door dovetail structure comprising a pair of opposed, rigid bearing blocks supported for sliding movement in the direction of movement of the free edge of the door as it moves into and away from closed position and for spreading movement of the inner ends of the blocks away from each other, a wedge member having bearing surfaces converging at an angle less than the angle of the cooperating surfaces of the bearing blocks when the wedge member is out of position between said blocks, oppositely arranged abutments on said wedge member for engagement with the outer ends of said blocks, and means urging said blocks toward the limit of their sliding movement in one direction and urging the inner ends of said blocks toward each other.

8. A door dovetail structure comprising a pair of opposed, rigid bearing blocks supporting for sliding movement in the direction of movement of the free edge of the door as it moves into and away from closed position, a wedge member having converging bearing surfaces corresponding to the cooperating bearing surfaces of said blocks when said wedge member is in position between said blocks, oppositely arranged abutments on said wedge member for engagement with the outer ends of said blocks to slide said blocks in one direction, and resilient means urging said blocks in the opposite direction.

JOSEPH J. SEITZ.
ERNEST K. WILLIAMS.